United States Patent
Williams et al.

(10) Patent No.: US 7,545,110 B2
(45) Date of Patent: Jun. 9, 2009

(54) MOTOR DRIVE CONTROL

(75) Inventors: Connel Brett Williams, Leamington Spa (GB); Jiang Li, Birmingham (GB)

(73) Assignee: TRW Limited (GB)

( * ) Notice: Subject to any disclaimer, the term of this patent is extended or adjusted under 35 U.S.C. 154(b) by 218 days.

(21) Appl. No.: 11/784,505

(22) Filed: Apr. 6, 2007

(65) Prior Publication Data

US 2007/0290640 A1 Dec. 20, 2007

Related U.S. Application Data

(63) Continuation of application No. PCT/GB2005/003771, filed on Sep. 30, 2005.

(30) Foreign Application Priority Data

Oct. 7, 2004 (GB) ................................. 0422201.4

(51) Int. Cl.
  *H02P 7/06* (2006.01)
  *H02P 6/18* (2006.01)
(52) U.S. Cl. .................. 318/254; 318/400.17; 318/268; 318/603; 388/819
(58) Field of Classification Search ................ 318/254, 318/438, 439, 268, 603, 606, 400.17, 801, 318/803; 388/819; 324/76.15
  See application file for complete search history.

(56) References Cited

U.S. PATENT DOCUMENTS

| 4,782,272 | A | * | 11/1988 | Buckley et al. | ........ | 318/400.01 |
|---|---|---|---|---|---|---|
| 4,888,533 | A | * | 12/1989 | Gotoh et al. | ................ | 318/524 |
| 5,486,743 | A | * | 1/1996 | Nagai | ..................... | 318/400.13 |
| 6,653,812 | B1 | * | 11/2003 | Huo et al. | ................... | 318/801 |
| 6,694,287 | B2 | * | 2/2004 | Mir et al. | ..................... | 702/183 |
| 6,801,009 | B2 | | 10/2004 | Makaran et al. | | |
| 7,119,530 | B2 | * | 10/2006 | Mir et al. | .................. | 324/76.15 |
| 7,308,192 | B2 | * | 12/2007 | Williams et al. | ............ | 388/819 |
| 7,477,034 | B2 | * | 1/2009 | MacKay | ...................... | 318/268 |
| 2002/0171389 | A1 | * | 11/2002 | Nakazawa | ................... | 318/811 |
| 2003/0046028 | A1 | * | 3/2003 | Mir et al. | ..................... | 702/183 |

(Continued)

FOREIGN PATENT DOCUMENTS

JP 2004-297901 A 10/2004

(Continued)

*Primary Examiner*—Paul Ip
(74) *Attorney, Agent, or Firm*—MacMillan, Sobanski & Todd, LLC

(57) ABSTRACT

A drive system for a multi-phase brushless motor comprises a single current sensor drive circuit, including switch means, switchable between a plurality of states. A controller is arranged to provide pulse width modulated drive signals to control the switch means so as to control the time that the drive circuit switches between said states in each of a series of pulse width modulation periods, and to: determine a demanded voltage parameter set, identify PWM periods during which the demanded voltage parameter set is such that neither two nominal corresponding state times, nor a higher number of equivalent state times producing the same net voltage, in a single PWM period, would allow a predetermined minimum time to be spent in a predetermined number of active states sufficient for current sensing. For such PWM periods, modified state times are calculated that do allow sufficient time to be spent in a sufficient number of active states for the current in each of the phases to be determined by means of the current sensor.

25 Claims, 10 Drawing Sheets

U.S. PATENT DOCUMENTS

| | | | |
|---|---|---|---|
| 2005/0226607 A1* | 10/2005 | Williams et al. | 388/819 |
| 2005/0269982 A1* | 12/2005 | Coles et al. | 318/254 |
| 2006/0066280 A1* | 3/2006 | Bhaumik et al. | 318/599 |
| 2006/0132075 A1* | 6/2006 | Lee et al. | 318/439 |
| 2006/0152181 A1* | 7/2006 | Shao et al. | 318/254 |
| 2006/0176059 A1* | 8/2006 | Mir et al. | 324/503 |
| 2007/0001633 A1* | 1/2007 | Su et al. | 318/254 |
| 2007/0046234 A1* | 3/2007 | Crabill et al. | 318/439 |
| 2007/0069667 A1* | 3/2007 | Adra | 318/135 |
| 2007/0069669 A1* | 3/2007 | MacKay | 318/254 |
| 2007/0069675 A1* | 3/2007 | MacKay | 318/439 |
| 2007/0069676 A1* | 3/2007 | MacKay | 318/439 |
| 2007/0069677 A1* | 3/2007 | MacKay | 318/439 |
| 2007/0132415 A1* | 6/2007 | Patel et al. | 318/432 |
| 2007/0194731 A1* | 8/2007 | Fukamizu et al. | 318/254 |
| 2007/0216325 A1* | 9/2007 | Fukamizu et al. | 318/254 |

FOREIGN PATENT DOCUMENTS

| | | | |
|---|---|---|---|
| WO | WO 2004/023639 A1 | 3/2004 | |

* cited by examiner

MOTOR DRIVE CONTROL

CROSS-REFERENCE TO RELATED APPLICATIONS

This application is a Continuation of International Application No. PCT/GB2005/003771 filed Sep. 30, 2005; the disclosures of which are incorporated herein by reference, and which claimed priority to Great Britain Patent Application No. 0422201.4 filed Oct. 7, 2004.

BACKGROUND OF THE INVENTION

This invention relates to electric motor control, and in particular to pulse width modulation (PWM) control of multiple phase brushless motors.

Control systems for electric motors need to measure the current through the windings or phases of the motor and this can either be done by means of separate current sensors for each of the phases, or by means of a single current sensor that is placed in the circuit so as to measure the total instantaneous current flowing between a D.C. power supply and the bridge circuit and motor combination. In a single current sensor system, the multiple motor phase currents are derived by offsetting the PWM patterns of the switches which apply the required voltage to each phase, and sampling the current sensor at appropriate points. Under certain configurations this can place constraints on the PWM pattern that limit the maximum fundamental phase voltage that can be produced.

One method of overcoming these constraints is to simply not measure the current in PWM periods where the switching times do not allow the current sensor to be sampled sufficiently for the current in each of the phases to be determined. This technique works satisfactorily on certain systems, in particular high inertia, low bandwidth systems. However, it is less suitable for systems that are highly dynamic, with low inertia, that require fast and accurate control. It is therefore an aim of the invention to maximise the magnitude of the fundamental phase voltage produced by a single current sensor drive system, whilst ensuring that the current sensor can be sampled in each PWM period.

BACKGROUND OF THE INVENTION

The present invention provides a drive system for a multi-phase brushless motor comprising a plurality of phases, the system comprising a drive circuit including switch means for varying the electric potential applied to each of the phases by switching the drive circuit between a plurality of states, a current sensor connected such that it can sense the instantaneous total current flowing through the windings, and control means arranged to provide pulse width modulated drive signals to control the switch means so as to control the time that the drive circuit switches between said states in each of a series of pulse width modulation periods, and to:
  determine a demanded voltage parameter set,
  identify PWM periods during which the demanded voltage parameter set is such that neither two nominal corresponding state times, nor a higher number of equivalent state times producing the same net voltage, in a single PWM period, would allow a predetermined minimum time to be spent in a predetermined number of active states sufficient for the current in each of the phases to be determined by means of the current sensor,
  for such PWM periods, to calculate modified state times that do allow sufficient time to be spent in a sufficient number of active states for the current in each of the phases to be determined by means of the current sensor.

The state times may be defined in terms of state vectors. In this case they may be modified by modifying the states vectors. Alternatively they may be defined in terms of switching times at which the drive current is switched between states. In this case they can be modified by identifying the switching times.

The demanded voltage parameter set may include only a single parameter, such as a modulation index, or may include two or more parameters, such as alpha and beta voltage demands.

The present invention further provides a drive system for a multi-phase brushless motor comprising a plurality of phases, the system comprising a drive circuit including switch means for varying the electric potential applied to each of the phases by switching the drive circuit between a plurality of states, a current sensor connected such that it can sense the instantaneous total current flowing through the windings, and control means arranged to provide pulse width modulated drive signals to control the switch means so as to control the time that the drive circuit switches between said states in each of a series of pulse width modulation periods, and to:
  determine a demanded voltage parameter set,
  for some values of the demanded voltage parameter set, identify two states which could, if selected for nominal state times, achieve the demanded voltage parameter set, and
  define modified state times for the same two states, one being of said predetermined minimum time, and the other being a predetermined maximum time.

Other advantages of this invention will become apparent to those skilled in the art from the following detailed description of the preferred embodiments, when read in light of the accompanying drawings.

DETAILED DESCRIPTION OF THE INVENTION

Figure 1:
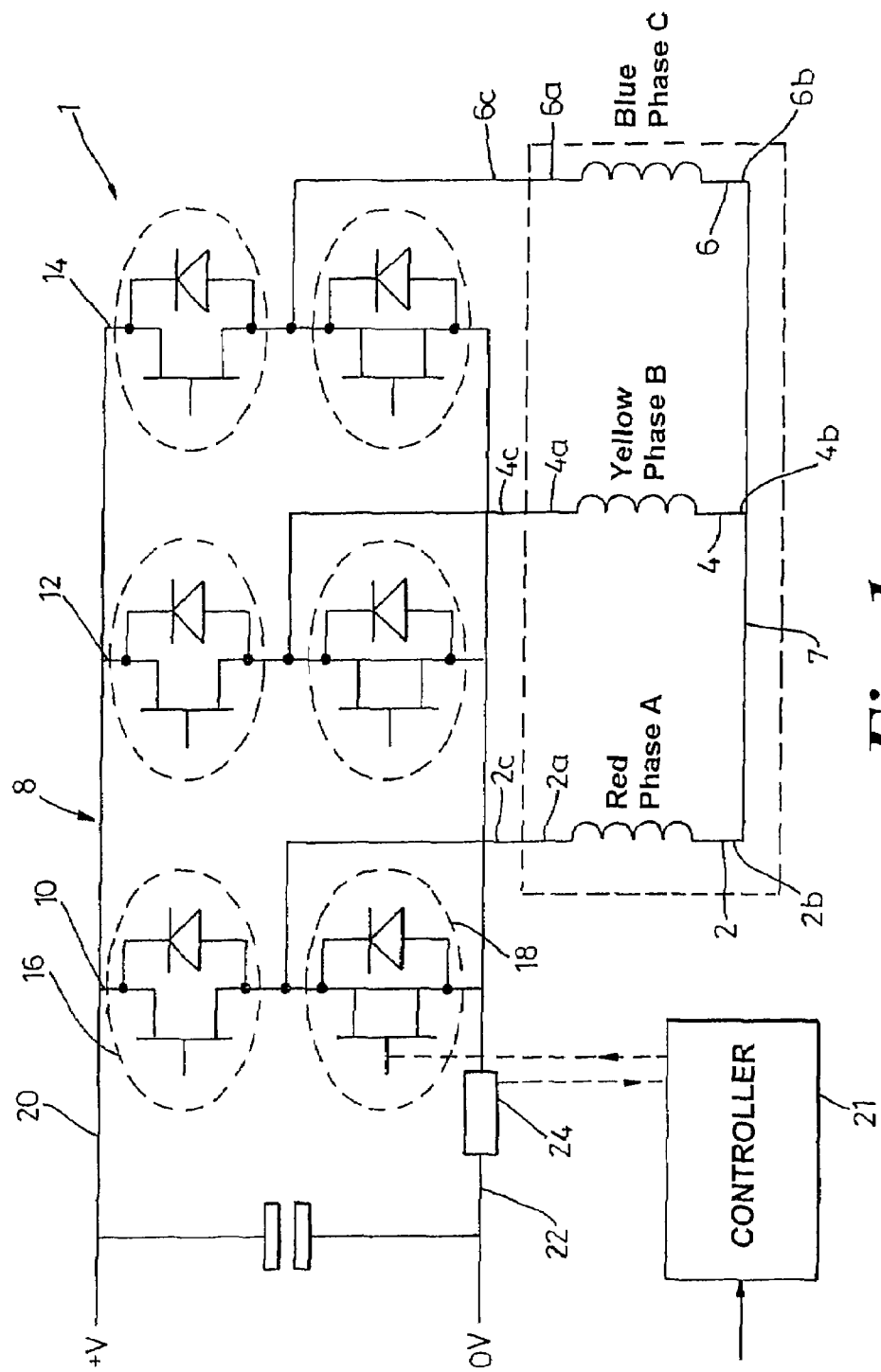
FIG. 1 is diagram of a drive circuit for a motor according to the invention.

Referring to FIG. 1 a three phase brushless motor 1 comprises three motor windings 2, 4, 6, generally designated as phases A, B and C, connected in a star network. One end 2a, 4a, 6a of each coil is connected to a respective terminal 2c, 4c, 6c. The other ends 2b, 4b, 6b, of the coils are connected together to form the star centre 7. A drive circuit comprises a three phase bridge 8. Each arm 10, 12, 14 of the bridge comprises a pair of switches in the form of a top transistor 16 and a bottom transistor 18 connected in series between a supply rail 20 and ground line 22. The motor windings 2, 4, 6 are each tapped off from between a respective complementary pair of transistors 16, 18. The transistors 16, 18 are turned on and off in a controlled manner by a controller 21 to provide pulse width modulation of the potential applied to each of the terminals 2c, 4c, 6c, thereby to control the potential difference applied across each of the windings 2, 4, 6 and hence also the current flowing through the windings. This in turn controls the strength and orientation of the magnetic field produced by the windings.

A current measuring device in the form of a resistor 24 is provided in the ground line 22 between the motor 1 and ground so that the controller 21 can measure the total current flowing though all of the windings 2, 4, 6. In order to measure the current in each of the windings the total current has to be sampled at precise instances within the PWM period where the voltage applied to each terminal of the winding (and hence the conduction state of a particular phase) is known, as will be explained in more detail below.

Figure 2:
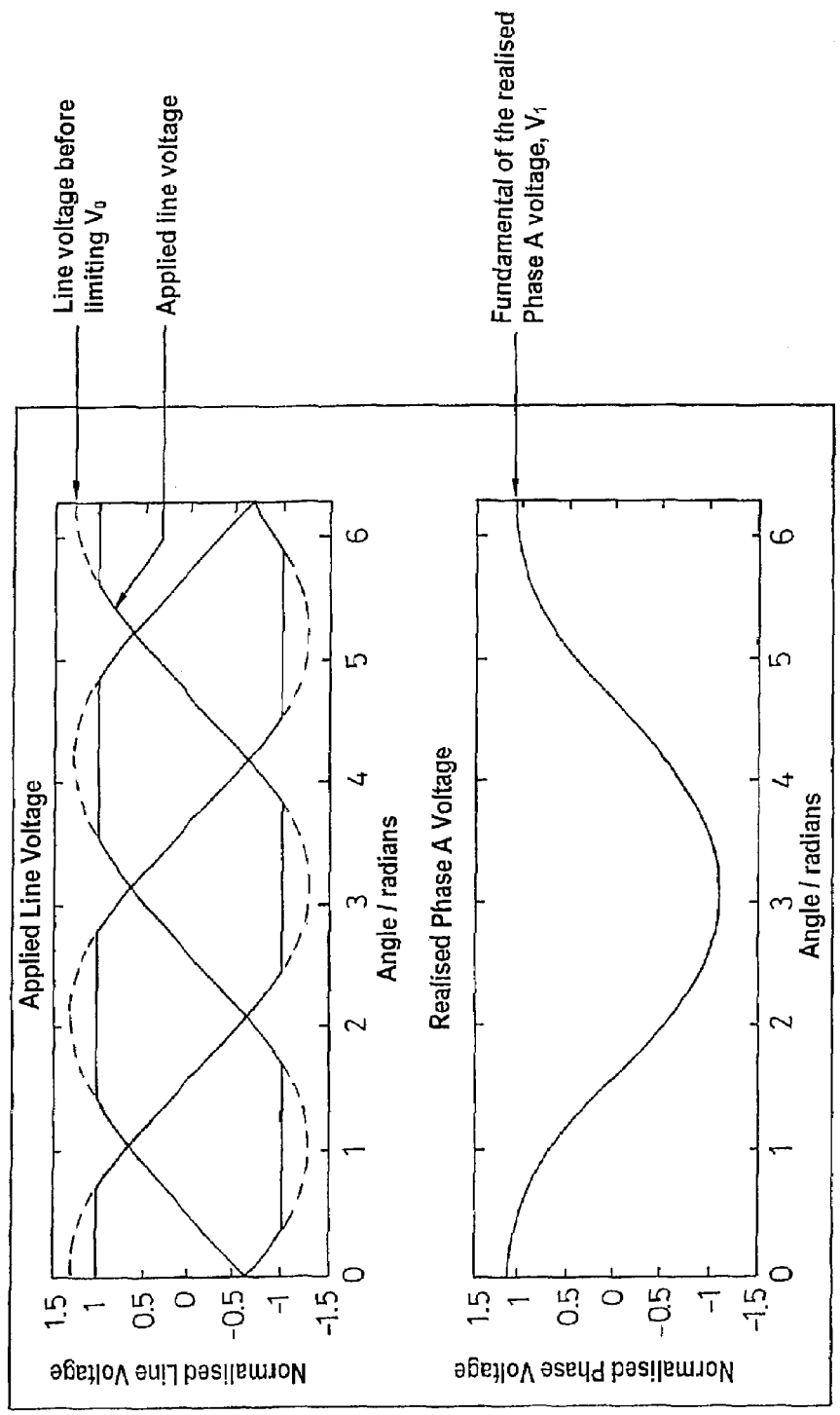
FIG. 2 shows how the line and fundamental phase voltages in the motor of FIG. 1 vary with time during one electrical cycle of the motor.

In order to achieve the smoothest operation, the applied phase voltages (the potential difference between the voltage at the terminal 2c, 4c, 6c of the winding and the star point 7) should vary in a sinusoidal manner with one cycle for each electrical revolution of the motor. However, the maximum terminal voltage (the potential difference between the potential at the terminal 2c, 4c, 6c, of the machine and the potential of mid-point of the DC supply), is $v_{dc}/2$ where $v_{dc}$ is the voltage difference between the positive DC supply rail and ground. If only sinusoidal voltages were applied to the machine terminals, the maximum peak phase voltage would also be $v_{dc}/2$. However, referring to FIG. 2, it is possible to increase the effective phase voltage using a known technique referred to as an 'overmodulation'. The terminal voltages are made to follow as closely as possible a sinusoidal variation, the amplitude $v_0$ of which is greater than $v_{dc}/2$. Since the terminal voltages cannot actually exceed $v_{dc}/2$, this results in the peaks of the terminal voltage cycle being clipped so that the terminal voltages stay at a constant $\pm v_{dc}/2$ over part of each cycle. In FIG. 2 the terminal voltages are shown as normalised values with $v_{dc}/2$ represented as 1.

Modulation depth is defined herein as $v_o/(v_{dc}/2)$ and will therefore be greater than one for over-modulation.

The resultant phase voltage cycle, that is the variation in the voltage across one of the windings between its terminal 2c, 4c, 6c and the star centre point 7, is also shown in FIG. 2. Again this is normalised with 1 representing the phase voltage produced by a smooth sinusoidal line voltage with a normalised amplitude of 1. It can be seen that, even with overmodulation, the phase voltage follows a reasonably smooth curve, although there is some distortion which can result in vibration and noise in the motor.

The fundamental component of the phase voltage is the component of the voltage whose frequency matches the electrical frequency of the motor. This voltage component is important as it produces the fundamental current component that is responsible for producing the useful motive torque in the machine. The purpose of the invention is to maximise this phase voltage component, whilst minimising the generation of distorting voltage components at other spatial and temporal frequencies. The achieved fundamental voltage magnitude is herein described using the modulation index, which is herein defined as $v_1/(v_{dc}/2)$, where $v_1$ is the magnitude of the fundamental component of the realised phase voltage. It should be noted that although the above argument is presented for a three-phase star-connected winding, similar factors apply for other winding topologies, such as delta connected windings, and phase numbers, for example three- or six-, or even four- or five-phase motors.

To maximise the phase voltage fundamental the timing of rising and falling switching events for each of the transistors in the drive (for example in a three-phase drive there will be six transistor switches) must be optimised. The modulation algorithm used to calculate the duty cycle demands for the switches (that is the ratio of the on-time of the switch to the PWM period), does not in itself determine the maximum available voltage. The phase voltage fundamental is only limited by the final switching algorithm that converts the duty cycle demands into switching edge positions. One convenient form of the modulation algorithm uses Space Vector Modulation (SVM) which is described in more detail below. However, any modulation technique (such as sine-triangle PWM, sine-triangle PWM with triplen injection or SVM) can equally be used without affecting the maximum phase voltage utilisation. The primary difference between using the different modulation schemes will be the amount of distorting (non-fundamental) components of the voltage that are produced.

Figure 3:
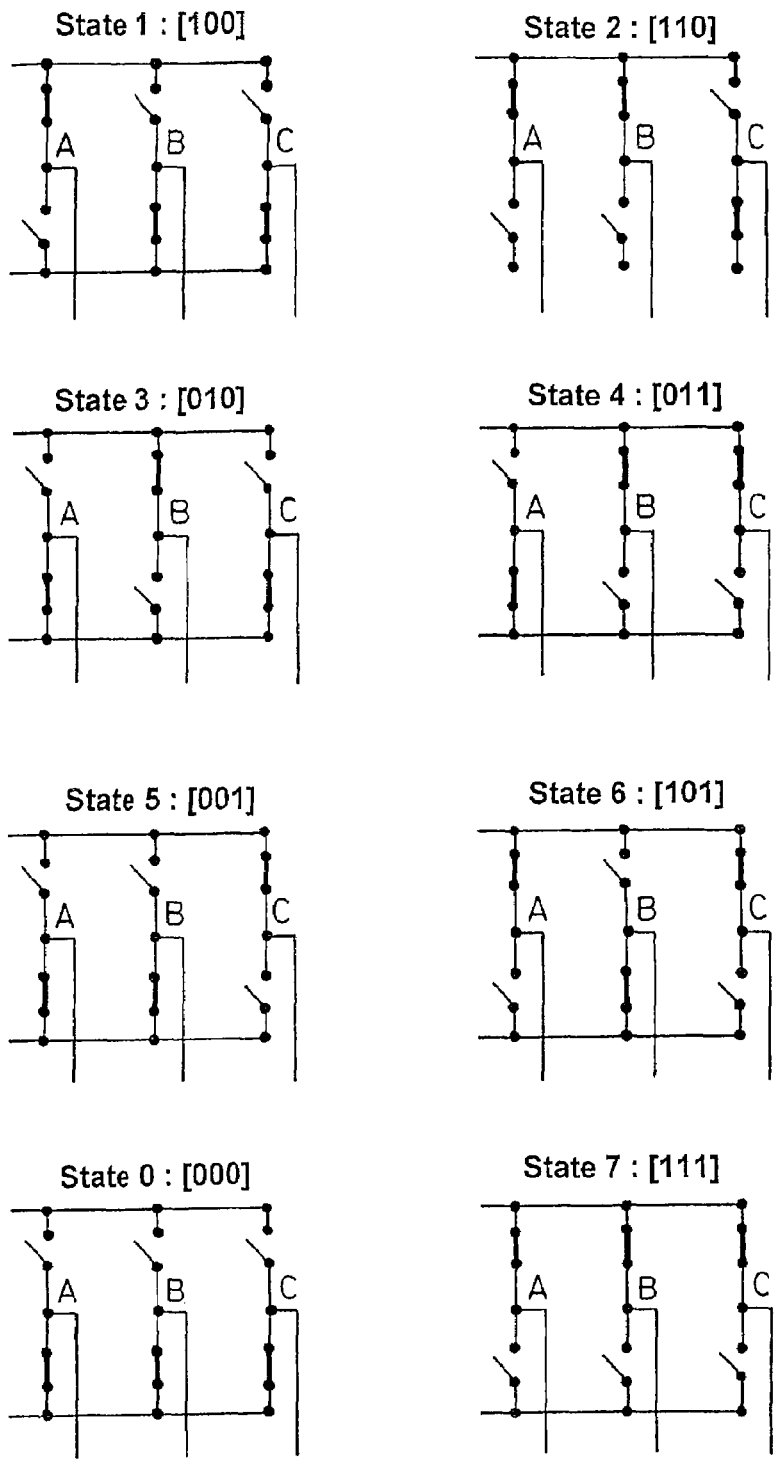
FIG. 3 shows the various possible states of the transistors of the circuit of FIG. 1.

Referring to FIG. 3, each winding 2, 4, 6 in a three phase system can only be connected to either the supply rail 20 or the ground line 22 and there are therefore eight possible states of the control circuit. Using 1 to represent one of the phases being at positive voltage and 0 to represent a phase connected to ground, state 1 can be represented as [100] indicating phase A at 1, phase B at 0 and phase C at 0, State 2 is represented as [110], state 3 as [010], state 4 as [011], state 5 as [001], state 6 as [101], state 0 as [000] and state 7 as [111]. Each of states 1 to 6 is a conducting state in which current flows through all of the windings 2, 4, 6, flowing in one direction through one of them and in the other direction through the other two. State 0 is a zero volt state in which all of the windings are connected to ground and state 7 is a zero volt state in which all the windings are connected to the supply rail.

When the circuit is being controlled to produce pulse width modulation, each of the phases will normally be turned on and off once in each PWM period. The relative lengths of time that are taken up in each state will determine the magnitude and direction of the magnetic field produced in each winding, and hence the magnitude and direction of the total torque applied to the rotor. These lengths of time can be calculated by various modulation algorithms as mentioned above.

Figure 4:
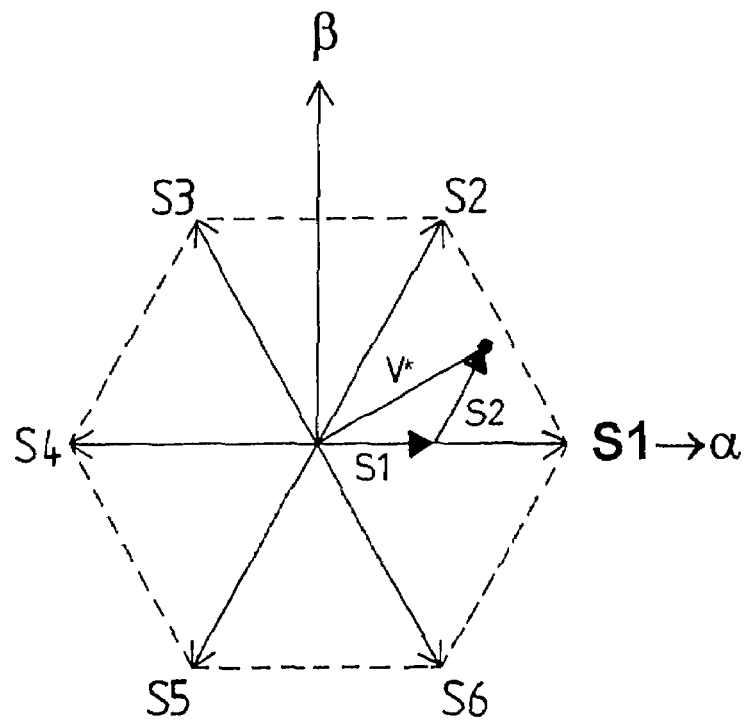
FIG. 4 is a space vector modulation diagram used to describe operation of the circuit of FIG. 1.
Figure 5:
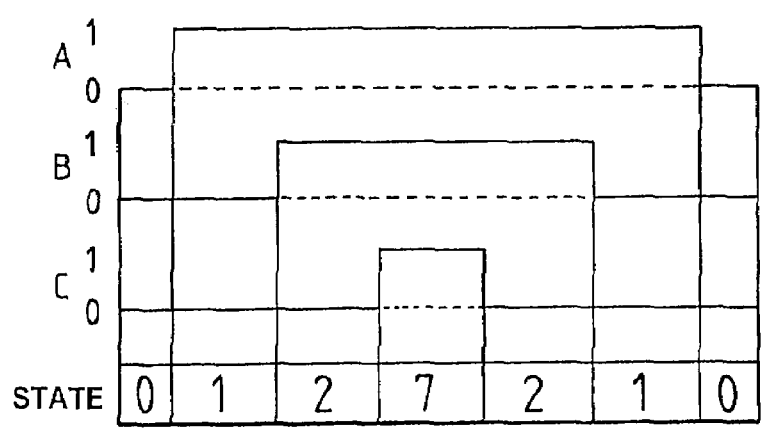
FIG. 5 is a state timing diagram showing a possible modulation used in the circuit of FIG. 1.

Referring to FIG. 4, in state vector modulation systems, the times in each PWM period spent in each of the states are represented as state vectors in a space vector modulation (SVM) diagram. In this type of diagram, single state vectors are those in the directions of the vectors S1 to S6, and the length of the vectors in each of these directions represents the amount of time in each PWM period spent in the respective state. This means that any desired voltage in the windings can be represented as a point on the diagram which corresponds to a voltage vector v* which represents the magnitude and direction of the voltage, and can be produced in the example shown by a combination of state vectors s1, s2, the length of which represent the time in each PWM period spent in that state. FIG. 5 shows a typical duty cycle used to achieve the required voltages, in which the ON time for each phase A, B and C is centred at the centre of the PWM period. This produces two equal periods spent in each of states 1 and 2 and ensures that, at the beginning and end of the cycle, all of the phases are OFF.

If the circuit remains in any one state for the whole of a duty cycle, then the resultant voltage is represented by a vector in one of the directions S1 to S6, the length of which corresponds to the PWM period $T_p$. Because the sum of the time spent in the different states in each duty cycle must add up to the PWM period $T_p$, the range of theoretically achievable voltage vectors is defined by the hexagon shown in FIG. 4 joining the points of the vectors of length $T_p$ in the directions S1 to S6. Any point within this hexagon can be reached from the centre by two state vectors whose lengths, when added together, are less than or equal to $T_p$. In theory this would mean that any demanded voltage vector for a PWM period could be achieved by switching to two correctly selected states, each for the correct duration of time. However, there are various factors which in practice restrict the range of possible voltage vectors, which will now be described.

Figure 6:
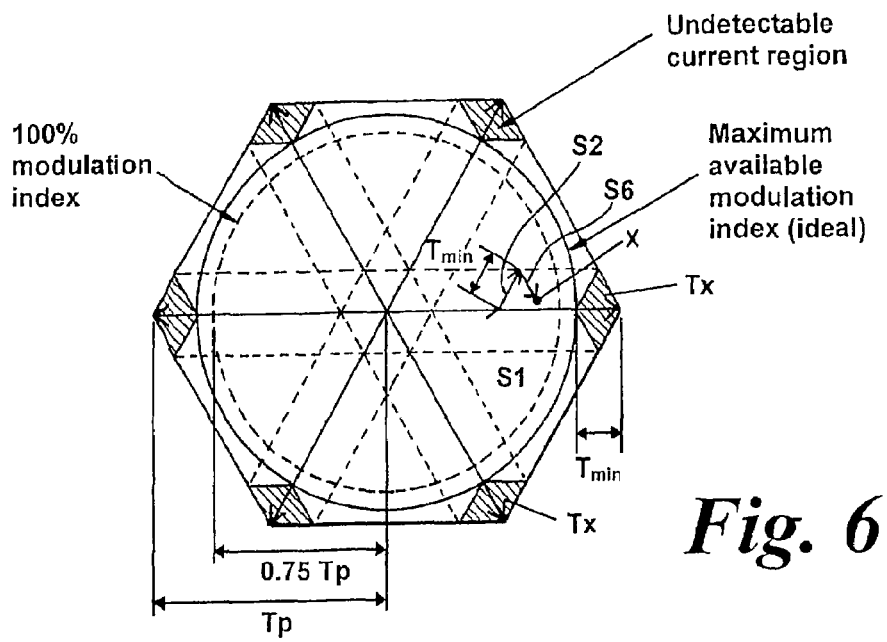
FIG. 6 is a space vector diagram showing aspects of the operation of the system of FIG. 1.

Referring to FIG. 6, the voltage magnitude of the six primary voltage vectors is $2v_{dc}/3$. This is the maximum voltage which can be produced across one of the windings e.g. if it is connected to the supply rail and the other two are connected to ground. A modulation index of 100%, i.e. sine-triangle PWM with no over modulation, results in a fundamental phase voltage of $v_{dc}/2$, giving a modulation depth locus as shown which is a circle of radius 0.75 $T_p$.

As mentioned above, most systems have a current sensor in each phase. However, for a single current sensor system, there are further constraints. In a system with a single current sensor, there is a requirement for at least two (in the case of a three phase system) non-zero states (that is states other than state 0 or 7) to be applied for a minimum time $T_{min}$ in each period. This requirement is herein referred to as the minimum state time criterion. This is to allow sufficient time to measure the current in the current sensor to determine the current in all of the phases. In the space vector diagram of FIG. 6 this means that, to reach the desired point on the diagram at least two different vectors must be used with a minimum length of $T_{min}$. Without this constraint, if the vectors are allowed to be of any length, then any point on the diagram can be reached by just two nominal vectors. However, for areas of the vector space which lie within a distance $T_{min}$ of one of the six primary vectors, the desired voltage vector cannot be achieved from just the two nominal primary vector components, because one of them would be too short. Instead, for those areas, three or more equivalent primary vector components are used, two of which are of length at least $T_{min}$. These are chosen to have the same vector sum as the two nominal vector components. An example of this is shown in FIG. 6 where the point in vector space x could be reached by two nominal vectors, s1 and s2, with the s2 component being significantly shorter than $T_{min}$. However in order to enable single current sensing, it is reached using equivalent components, including a first component s1, a second component s2 which is of length $T_{min}$, and a third component s6 which is shorter than $T_{min}$. This means that, in one duty cycle, the drive circuit will spend time in each of states S1, S2 and S6, but that the time in each of S1 and S2 will be sufficient to allow current measurement by the single current sensor. The only parts of the vector space which are then excluded due to the single current sensor requirement are those in the areas Tx. These are the areas corresponding to one state time greater than a maximum time $T_{max}$ which is equal to $T_p-T_{min}$ and another state time less than $T_{min}$. In actual systems there is a further limit on the amount of time available during the PWM period for the active state times. This is referred to as dead time or interlock delay. This is a time that is allowed between turning the upper transistor of a phase leg off, and turning the lower transistor of the same phase leg on, and a similar delay allowed between turning the lower transistor of a phase leg off, and turning the upper transistor of the same phase leg on. The purpose of this interlock delay is to prevent both transistors being turned on simultaneously, which would result in a potentially damaging short-circuit across the DC bus. Taking this into account, $T_{max}$ is given by $$T_{max}=T_p-2T_{id}-T_{min}$$

Where $T_p$ is the PWM period $T_{id}$ is the interlock delay.

From FIG. 6 it can be seen that, ignoring interlock delay, the ideal maximum realisable modulation index for low distortion phase voltages is described by a circle of radius $T_p-T_{min}$. The maximum achievable modulation index is thus $\frac{4}{3}(1-T_{min}/T_p)$. Therefore, for example, if the PWM period $T_p$ is 49.6 μs, the minimum state time $T_{min}$ is 6.4 μs, the maximum achievable modulation index is 1.16. However, if some distortion of the phase voltages is acceptable, then a non-circular trajectory can be used. This means that the relationship between demanded and achieved modulation indices becomes non-linear.

Figure 7:
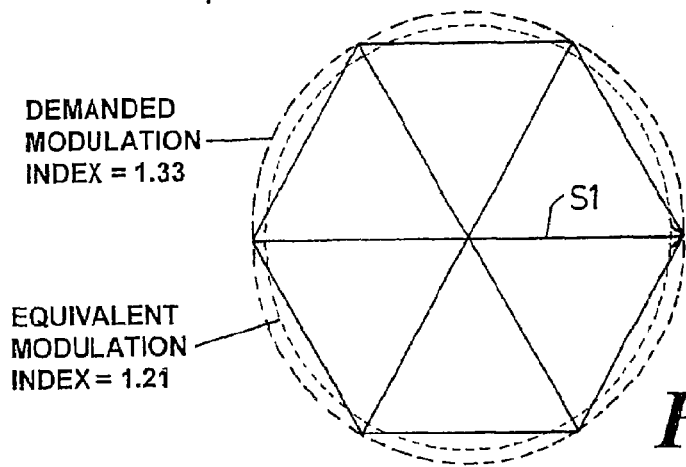
FIG. 7 is a space vector diagram showing possible limiting modulation indexes of the system of FIG. 1

Referring to FIG. 7, if the modulation index demand is increased up to 1.33 (4/3), the space-vector describes a hexagonal trajectory around the limit of vector-space. Although this results in slightly distorted phase voltages, the phase-voltage fundamental increases significantly, and the effective modulation index is around 1.21.

As described above, it is desirable in some applications to increase the modulation index available in a single-sensor system within the limitations described above and without missing any current samples.

This can be achieved by allowing the modulation index demand to be increased to 1.33, but in the areas that cannot be entered because of single-sensor limitations, modifying the space vector to produce a vector that is as close as possible to the demanded vector but does not lie in the inadmissible area. The modification of the vector will distort the phase voltage waveform, and so the choice of modification is a trade-off between distortion and magnitude of the effective modulation index this achieves.

Figure 8:
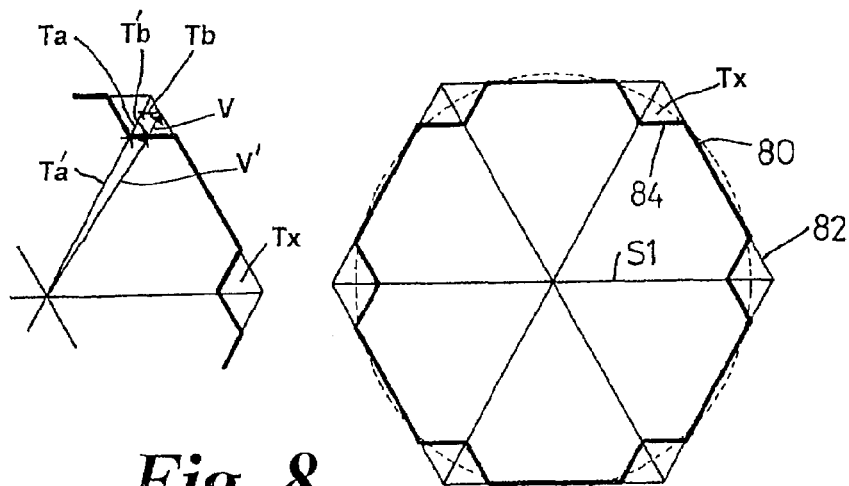
FIG. 8 is a space vector diagram showing one mode of operation of the system of FIG. 1.

There are many ways in which the vector may be modified. Referring to FIG. 8, in one embodiment of the invention the demanded vector magnitude is allowed to go up to the maximum allowed in conventional SVM (1.33). The vector is then modified if it lies in an area not permitted with a single current sensor.

The space vectors are calculated using standard space vector modulation techniques as follows:

1. The alpha and beta voltage demands are calculated and normalised with respect to half of the DC link voltage.
2. The magnitude of the alpha beta voltages are limited to MAX_MODULATION_INDEX, which in this case is 1.33.
3. The SVM sector that the voltage demand vector lies in is determined.
4. The nominal duration, $T_a$ and $T_b$, of the two non-zero SVM states adjacent to that sector are calculated to produce a compound vector equal to the demanded voltage vector. This calculation is carried out as if single current sensing was not being used.
5. The length of the vectors $T_a$ and $T_b$ is limited to ensure that the resultant PWM pattern is viable, i.e. that they add up to a total that is no more than the total available time within the PWM period.
6. If the lengths of the vectors $T_a$ and $T_b$ are such that they are not both longer than $T_{min}$ and there is no set of three vectors that provide the same sum and include two vectors longer than $T_{min}$, then this means that the vectors need to be modified for the current sensing to be performed in that PWM period.

Where the nominal demanded vector V lies in an inadmissible area Tx, in modifying the nominal vector V to a modified vector V' the angle of the vector is maintained, but the length of the vector is reduced so that it lies on the boundary of the inadmissible area Tx. This is achieved by identifying which is the longer and which is the shorter of the two nominal vectors $T_a$ and $T_b$ and modifying the longer one by reducing it to $T_{max}$ and modifying the other by reducing it by the same ratio. This is carried out using the following algorithm:

```
IF T_a > T_max THEN
  T_a' = T_max
  T_b' = T_b * T_max/T_a
ENDIF
IF T_b > T_max THEN
  T_b' = T_max
  T_a' = T_a * T_max/T_b
ENDIF
```

The maximum modulation index is set to 1.33.

As can be seen from FIG. 8, this results in a voltage trajectory 80 in SVM space that follows the boundary 82 of the hexagonal vector space between the areas Tx that do not allow current sensing, and follows the inner boundaries 84 of those areas Tx.

Figure 9:
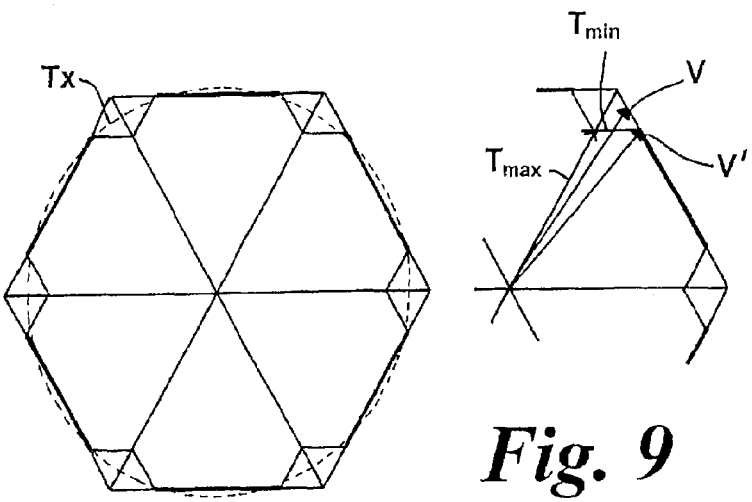
FIG. 9 is a space vector diagram showing another mode of operation of the system of FIG. 1.

Referring to FIG. 9, in a further embodiment of the invention, the demanded voltage vector V is again modified if it falls within the area Tx. However in this case the modified vector V' is set to be equal to the nearest possible vector outside the areas Tx, having the same modulation index. Hence both the angle and the magnitude of the vector may be changed. For high demanded modulation index, the longer of the two nominal vector components, which will be longer than $T_{max}$, is identified and reduced to $T_{max}$, and the shorter of the two vector components is identified and increased to $T_{min}$. This results in a trajectory as shown in FIG. 9, which again follows the lines forming the edges of the vector space hexagon between the areas Tx. At the ends of these lines, the modified vector is held constant until the shorter nominal vector changes, and the demanded vector enters the next sector of the SVM diagram. At this point the modified vector changes in a discontinuous manner to the end of the corresponding line in the next sector. This method can produce higher modulation index that the method of FIG. 8, but will produce greater distortion.

Figure 10:
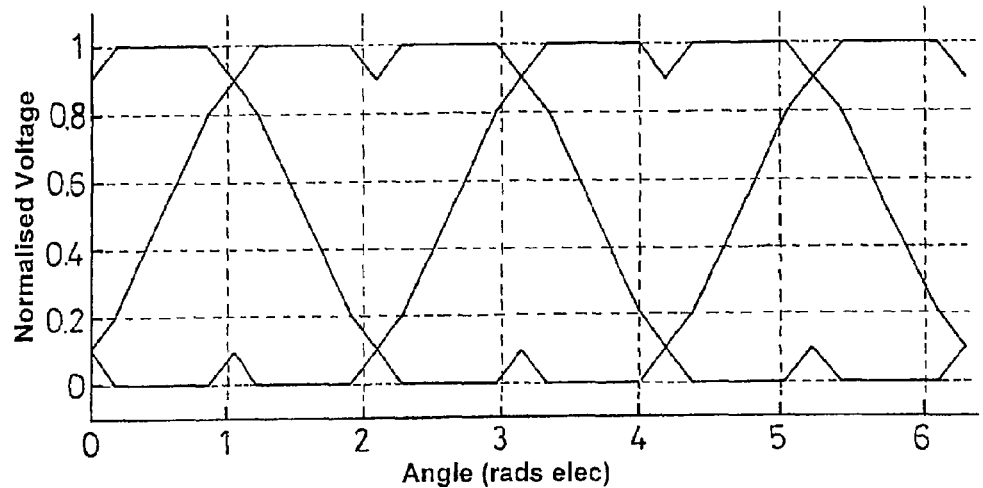
FIG. 10 is a graph showing normalized terminal voltages of the system operating according to FIG. 8
Figure 11:
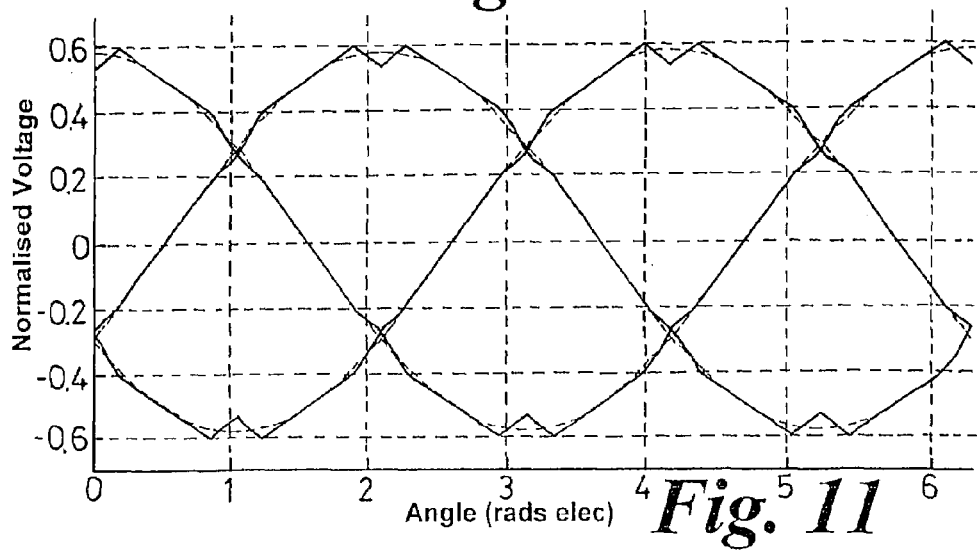
FIG. 11 is a graph showing normalized terminal voltages of the system operating according to FIG. 8

Referring to FIG. 10, the normalized terminal voltages for the system controlled according to FIG. 8 follow a very approximate sine wave pattern, but with each peak and trough being flattened and having a sharp dip at its centre. As shown in FIG. 11, this results in normalized phase voltages that are much closer to a true sine wave, with small discontinuities, giving some harmonic distortion. The fundamental voltages are shown in dotted lines in FIG. 11. In this example the modulation index is set to 1.33 and PWM overlap time $T_{min}$ is set to 20% of the PWM period $T_p$. In a practical system an overlap time of about 10% of the PWM period could be expected, and the resulting distortion would be less.

Figure 12:
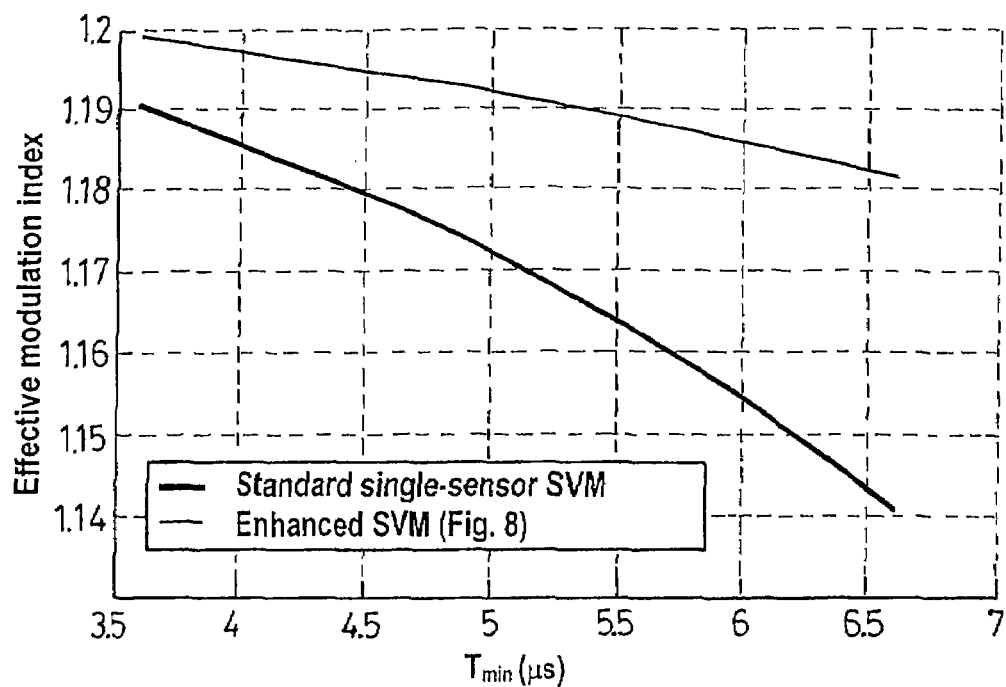
FIG. 12 is a graph showing how effective modulation index varies with minimum PWM overlap in the system of FIG. 1 operating according to FIG. 8.

Referring to FIG. 12 if the maximum effective modulation index of the simulated system of FIG. 8 is compared with that of a standard single sensor SVM control method using the maximum available modulation index shown in FIG. 6, then it can be seen that the system of FIG. 8 provides a maximum modulation index that is higher over a range of values of $T_{mni}$ from 3.5 to 6.5 µs. It can also be seen that the maximum modulation index is much less dependent on $T_{min}$ in the FIG. 8 system, and can therefore tolerate larger PWM overlap times. This is an important consideration since it is hard to reduce the overlap time in practical systems.

Figure 13:
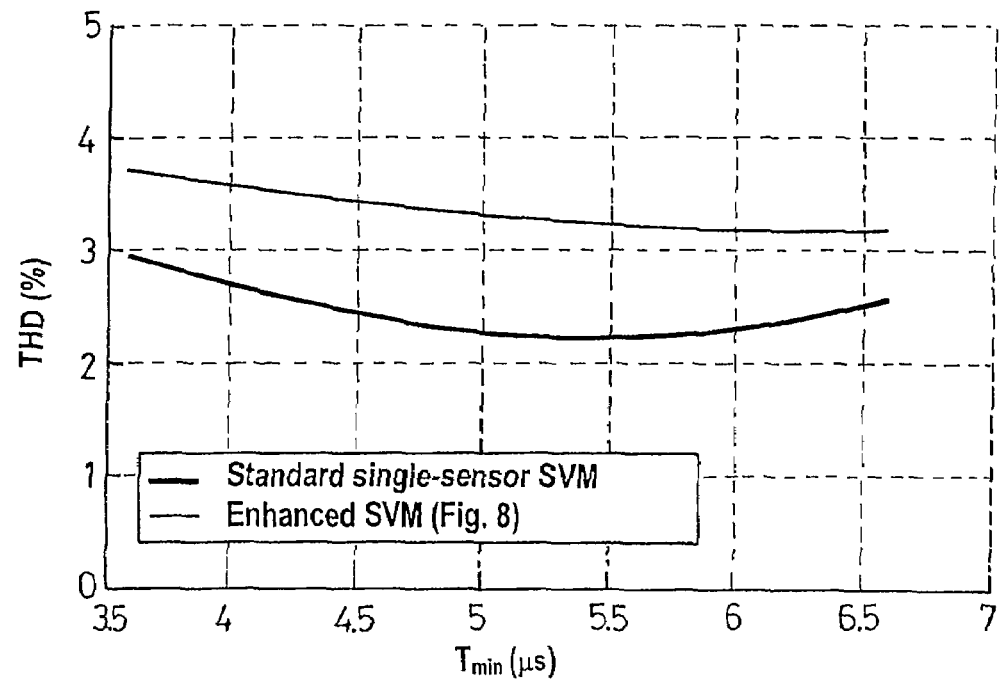
FIG. 13 is a graph is a graph showing how total harmonic distortion varies with minimum PWM overlap in the system of FIG. 1 operating according to FIG. 8.

Referring to FIG. 13, it can be seen that the FIG. 8 system has a slightly higher level of total harmonic distortion (THD) over the same range of overlap times than the conventional system. THD is a measure of the percentage of the phase voltage waveform that is at frequencies other then the fundamental frequency. However, this increased distortion is not high enough to cause significant problems in most systems.

In both of the methods of FIGS. 8 and 9 some distortion of the voltage waveform will occur when the voltage demand exceeds a certain level, which is 1.15 for the ideal case. This in turn will lead to distortion of the current waveform, which can have undesirable side-effects such as increased acoustic noise and torque ripple. Although the level of distortion is very small, and acceptable for a number of applications, it is possible to improve the distortion further.

Figure 14:
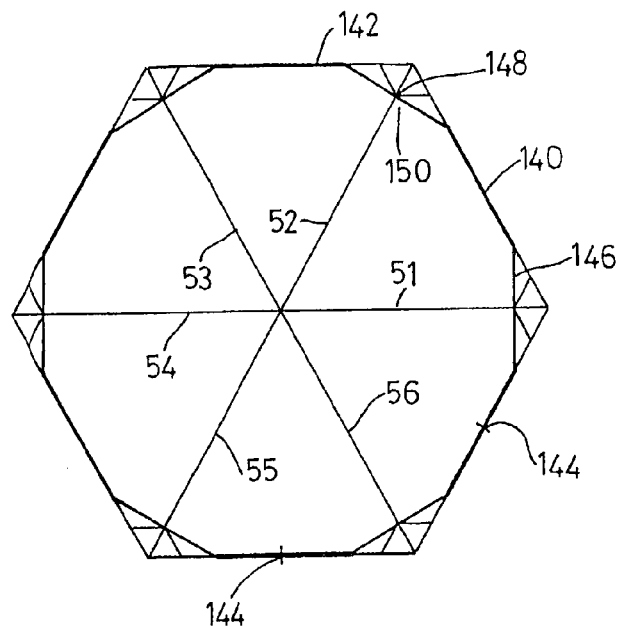
FIG. 14 is a space vector diagram showing a further mode of operation of the system of FIG. 1.

Referring to FIG. 14, one possible trajectory with lower distortion is in the shape of a twelve sided figure, or dodecahedron 140. In the ideal case this has six of its sides 142 on the centres 144 of the six sides of the SVM space hexagon, and the other six sides 146 passing just inside the innermost point 148 of the unavailable areas Tx. These sides 146 are therefore perpendicular to the vectors S1 to S6 and pass through them at points 150 where their length is equal to $T_{max}$. It will be appreciated that the dodecahedron may not be regular as the sides that lie on the sides of the hexagon will generally be of different length to the other six sides. The ratio will depend on the PWM overlap time. However, for a small enough interlock delay and overlap time it will be possible to have a regular dodecahedron, which will minimize the distortion. For a 50 µs PWM period and an interlock delay of 0.8 µs it can be shown that the maximum overlap time to allow a regular dodecahedron is 6.7 µs. It has been found that, in practical systems this can be met comfortably.

For a regular dodecahedron, the modified voltage vectors can be calculated as follows:

```
IF (T_a + T_b/2) > (3)/2 THEN
    T_b' = T_b/3(2 T_a + T_b)
    T_a' = (3)/2 − T_b'/2
ENDIF
IF (T_b + T_a/2) > (3)/2 THEN
    T_a' = T_a/3(2 T_a + T_b)
    T_b' = (3)/2 − T_a'/2
ENDIF
```

The maximum modulation index is again set to 1.33.

Figure 15:
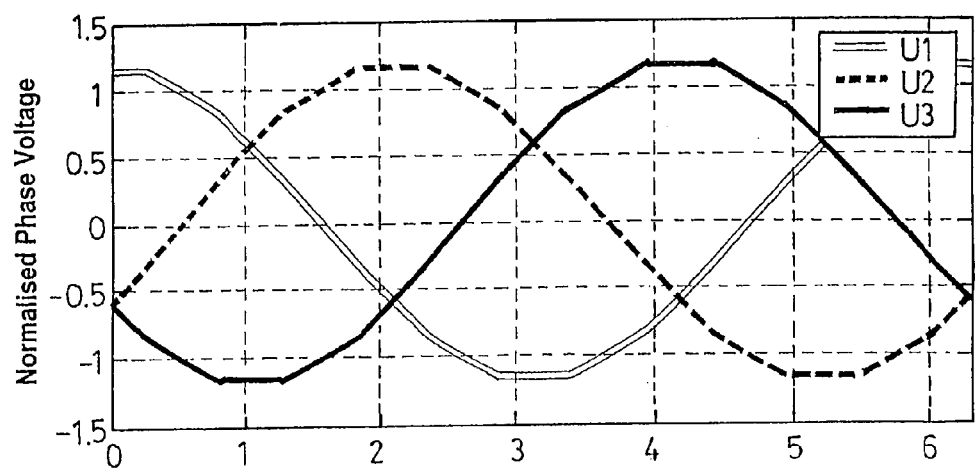
FIG. 15 is a graph showing normalised phase voltages in the system operating according to FIG. 14.

Referring to FIG. 15, the normalized phase voltages U1, U2, U3 for the control method of FIG. 14 are very close to pure sine waveforms, and the total harmonic distortion for this control method is lower than for either of the methods of FIGS. 8 and 9.

Figure 16:
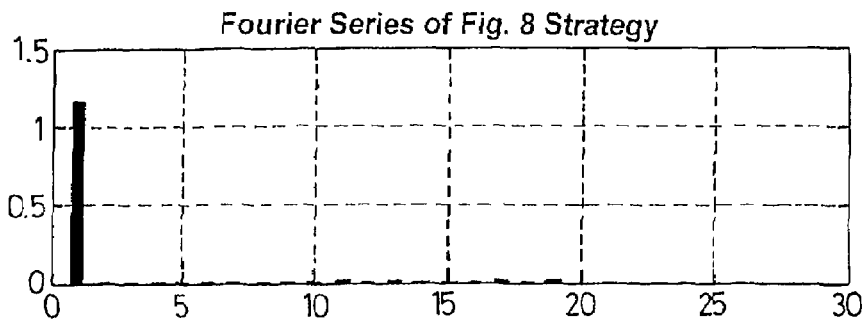
FIG. 16 is a graph showing the Fourier series for the system operating according to FIG. 8.
Figure 17:
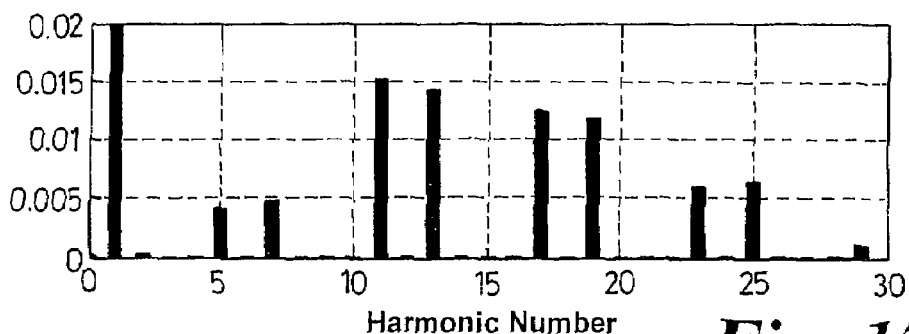
FIG. 17 is a magnified version of the graph of FIG. 16
Figure 18:
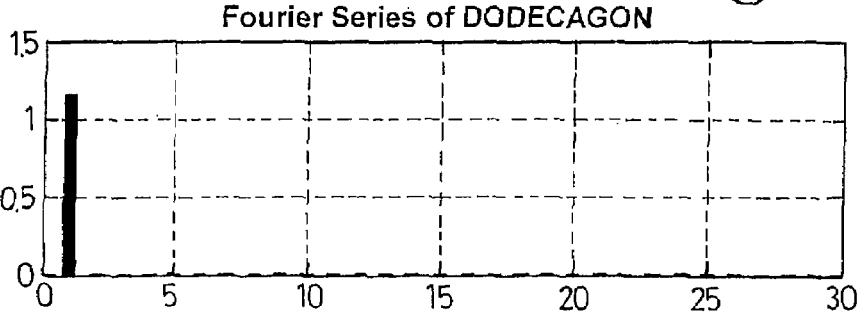
FIG. 18 is a graph showing the Fourier series for the system operating according to FIG. 14.
Figure 19:
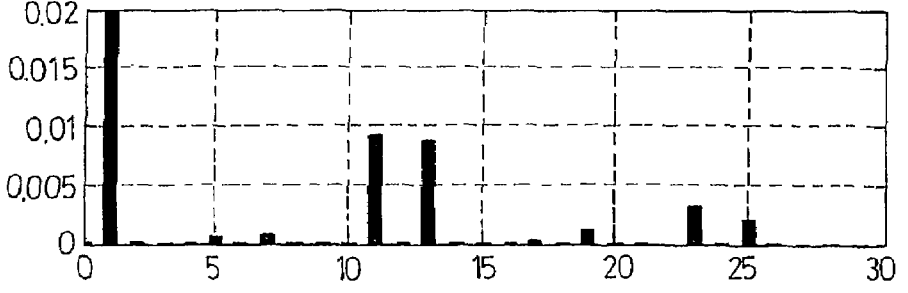
FIG. 19 is a magnified version of the graph of FIG. 18.

Referring to FIGS. 16 and 17, the FIG. 8 control strategy results in relatively low amount of harmonic distortion. The vertical scale in FIGS. 16 and 17 is voltage normalized with respect to $V_{dc}/2$. As can be seen from FIG. 16, the harmonic components of the voltage waveform are all significantly lower than the fundamental component. However, as can be seen from FIG. 17, there are some harmonic components at harmonic numbers of 5 and 7, 11 and 13, 17 and 19, 23 and 25. In comparison, the harmonic components of the strategy of FIG. 14 are, as can be seen from FIGS. 18 and 19, significantly lower at each of these harmonics. It is distortion at the lower harmonic numbers that causes the most problems, in particular with acoustic noise, because they have more effect on the resulting currents that the higher ones. It can be seen that the fifth and seventh harmonics, which are the lowest significant ones in the FIG. 8 control strategy, are greatly reduced in the FIG. 14 control strategy.

Figure 21:
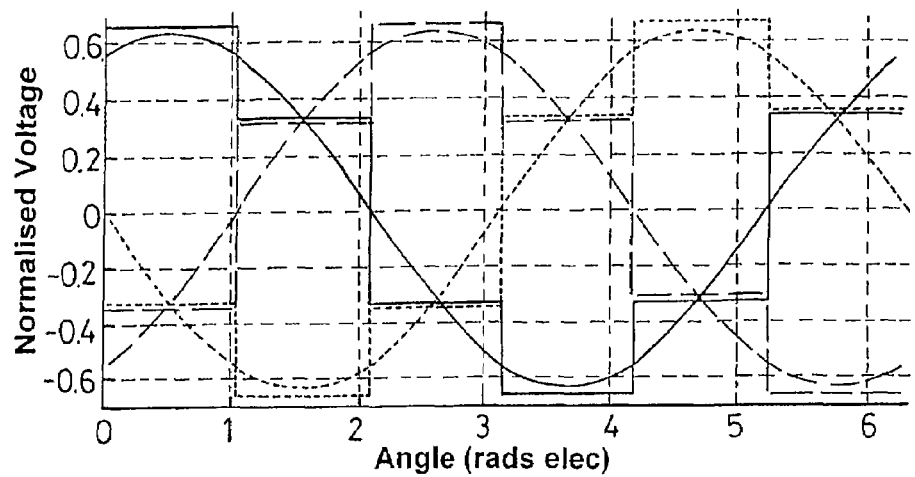
FIG. 21 is a graph showing normalised phase voltages and fundamental voltages of the system operating according to FIG. 20.
Figure 20:
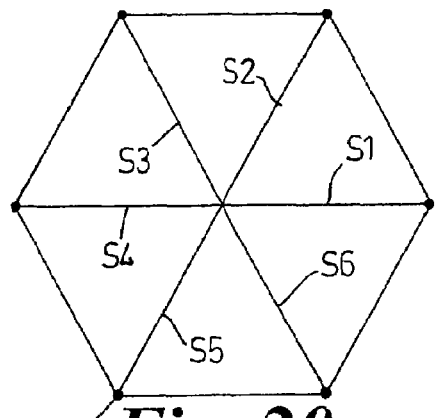
FIG. 20 is a space vector diagram showing a known six point method of operation of a motor control drive circuit.

Referring to FIG. 20, it is known to apply a control strategy to systems with two or more current sensors which can increase the modulation index above the 1.21 level shown in FIG. 7. This strategy is referred to as six-step mode (for a three phase system). In six-step mode, only one space vector is applied for each 60° of the electrical cycle. In SVM control, this means that the vector can only be in each of the corners of the SVM hexagon. This results in a phase voltage that has a six step pattern as shown in FIG. 21, and gives an effective modulation index of 1.27 ($4/\pi$), and fundamental phase voltages as shown in the broken lines in FIG. 21. Special algorithms exist to give a smooth transition between the control algorithm of FIG. 7 and the six-step algorithm. Operation using the algorithm of FIG. 7 is sometimes referred to as mode I operation, and operation for higher effective modulation index up to the maximum provided by six-step operation, is referred to as mode II.

Figure 22:
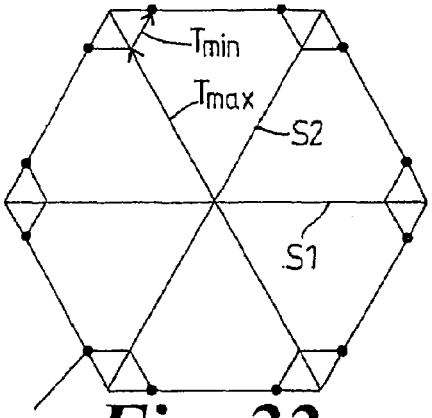
FIG. 22 is a space vector diagram showing a further mode of operation of the system of FIG. 1.
Figure 23:
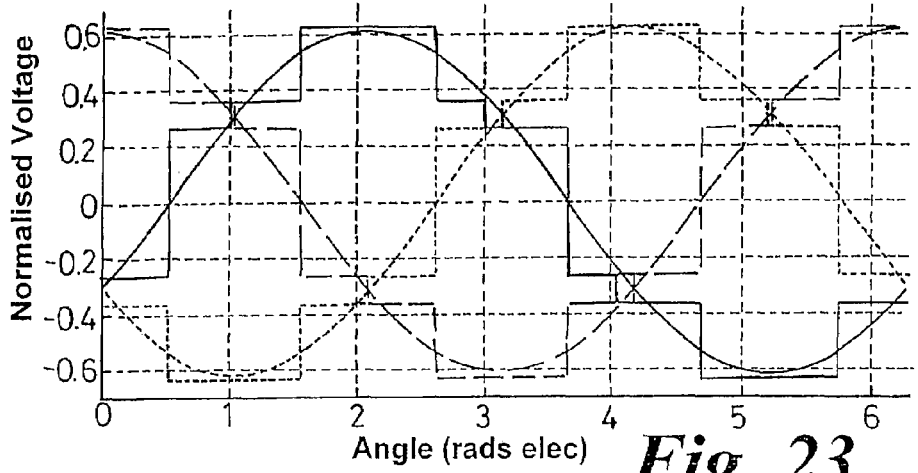
FIG. 23 is a graph showing normalised phase voltages and fundamental voltages of the system operating according to FIG. 22.

It will be appreciated that six-step operation is not possible in a single sensor system, because each of the six single voltage vectors lie in the unavailable region Tx. This is because, as only one active state is used in each PWM period, there is no second state during which current sampling can be made. However, in this embodiment of the invention a control strategy similar to six-step, but also allowing single current sensor operation is used. Referring to FIG. 22 this is achieved by using only 12 voltage vectors, each of which corresponds to being in one active state for time $T_{max}$ and one other active state for time $T_{min}$. In order to select which of the 12 voltage vectors to use, the two nominal vector components, i.e. active states, are identified, and the longer and the shorter of these identified. The longer one is then set to $T_{max}$ and the shorter one to $T_{min}$. This strategy provides an effective modulation index that is almost as high as six-step operation. For example, for a 50 μs PWM period, and a 4.2 μs overlap time, this method can provide an effective modulation index of 1.24. The resulting phase voltages are stepped as shown in FIG. 23, and the corresponding fundamental voltages shown in dotted lines. It can be seen that these are slightly lower than those of conventional six-step control as shown in FIG. 21, but not significantly so.

It will be appreciated that the method of FIG. 22 is compatible with the methods of FIGS. 8, 9 and 14 in that it also involves identifying demanded voltage vectors that are in the unavailable area Tx of the SVM diagram, and modifying them to define vectors that are available. It is therefore appropriate to have a control strategy that uses one of the strategies of FIGS. 8, 9 and 14 for a first mode and then, for higher demanded modulation index, switches to the strategy of FIG. 22. Alternatively the strategy of FIG. 22 could be used with different 'mode I' strategies.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. A drive system for a multi-phase brushless motor comprising:
   a drive circuit including switch means for varying the electric potential applied to each of the phases by switching the drive circuit between a plurality of states;
   a current sensor connected such that it can sense the instantaneous total current flowing through the windings, and;
   control means arranged to provide pulse width modulated drive signals to control the switch means so as to control the time that the drive circuit switches between said states in each of a series of pulse width modulation periods, said control means operative to:
   determine a demanded voltage parameter set,
   identify pulse width modulation periods during which the demanded voltage parameter set is such that neither two nominal corresponding state times, nor a higher number of equivalent state times producing the same net voltage, in a single pulse width modulation period, can allow a predetermined minimum time to be spent in a predetermined number of active states sufficient for the current in each of the phases to be determined by means of the current sensor, and
   for such pulse width modulation periods, to calculate modified state times that do allow sufficient time to be spent in a sufficient number of active states for the current in each of the phases to be determined by means of the current sensor.

2. A drive system for a multi-phase brushless motor comprising:
   a drive circuit including switch means for varying the electric potential applied to each of the phases by switching the drive circuit between a plurality of states;
   current sensor connected such that it can sense the instantaneous total current flowing through the windings; and
   control means arranged to provide pulse width modulated drive signals to control the switch means so as to control the time that the drive circuit switches between said states in each of a series of pulse width modulation periods, said control means operative to:
   determine a demanded voltage parameter set, for some values of the demanded voltage parameter set, identify two states which could, if selected for nominal state times, achieve the demanded voltage parameter set, and define modified state times for the same two states, one being of said predetermined minimum time, and the other being a predetermined maximum time.

3. A drive system for a multi-phase brushless motor comprising:

a drive circuit having a plurality of states and arranged to apply an electric potential to each of the phases, the drive circuit including switches to vary the electric potential applied to each of the phases, the switches being switchable to switch the drive circuit between the plurality of states such that the circuit is in each of the states for a respective state time, thereby producing a net voltage;

a current sensor connected such that it can sense the instantaneous total current flowing through the phases; and a controller arranged to define a series of pulse width modulation periods and to provide pulse width modulated drive signals to control the switches so as to control the time that the drive circuit switches between said states in each of the pulse width modulation periods, and to:

determine a demanded voltage parameter set, for each of the pulse width modulation periods, calculate two nominal corresponding state times having the same net voltage, identify pulse width modulation periods during which the demanded voltage parameter set is such that neither the two nominal corresponding state times, nor a higher number of equivalent state times producing the same net voltage, in a single pulse width modulation period, can allow a predetermined minimum time to be spent in a predetermined number of active states sufficient for the current in each of the phases to be determined by means of the current sensor, and for such pulse width modulation periods, to calculate modified state times that do allow sufficient time to be spent in a sufficient number of active states for the current in each of the phases to be determined by means of the current sensor.

4. A system according to claim 3 wherein the nominal state times include a longer state time for a first state and a shorter state time for a second state, and in the modified state times, the longer state time is reduced.

5. A system according to claim 4 wherein, in the modified state times, the shorter state time is increased.

6. A system according to claim 5 wherein, in the modified state times, the shorter state time is at least as long as a predetermined minimum time that is sufficient to allow the current sensor to take a current sample within it.

7. A system according to claim 5 wherein the modified state times $T'_a$, $T'_b$ are derived from the nominal state times $T_a$, $T_b$ using the algorithm $$\text{IF } (T_a + T_b/2) > (3)/2 \text{ THEN}$$
$$T_b' = T_b/3(2 T_a + T_b)$$
$$T_a' = (3)/2 - T_b'/2$$
$$\text{IF } (T_b + T_a/2) > (3)/2 \text{ THEN}$$
$$T_a' = T_a/3(2 T_a + T_b)$$
$$T_b' = (3)/2 - T_a'/2$$

8. A system according to claim 3 wherein the controller is arranged for each pulse width modulation period to:

identify the two required active states that would be required to achieve the demanded voltage parameter, determine the nominal state times for which the circuit would need to be in each of those states to achieve the demanded voltage parameter, and, if these state times do not allow current sensing within the pulse width modulation period, to modify the nominal state times to define the modified state times.

9. A system according to claim 8 wherein the control voltage parameter set comprises alpha and beta voltage demands.

10. A system according to claim 8 wherein the controller is arranged to limit the demanded voltage parameter set so as not to exceed a maximum modulation index.

11. A system according to claim 8 wherein the controller is arranged to identify such pulse width modulation periods by determining that one of the nominal state times would be longer than a predetermined maximum state time.

12. A system according to claim 11 wherein the controller is arranged for any such pulse width modulation periods to decrease said one of the nominal state times to the predetermined maximum state time, and to decrease another of the state times by the same ratio, to produce the modified state times.

13. A system according to claim 11 wherein the controller is arranged for any such pulse width modulation periods to decrease said one of the nominal state times to the predetermined maximum state time and to set another of the state times to said predetermined minimum time.

14. A system according to claim 11 wherein the controller is arranged to calculate the modified state times such that they produce a voltage that, when represented on a space vector modulation diagram, is limited to a lie within a polygon having four times as many sides as the motor has phases.

15. A system according to claim 14 wherein the controller is arranged such that half of the sides of the polygon lie on, or parallel to, the sides of the appropriate space vector polygon.

16. A system according to claim 3 wherein the controller is arranged, if the two nominal corresponding state times would not allow sufficient time to be spent in a sufficient number of active states for the current in each of the phases to be determined by means of the current sensor, to calculate a higher number of equivalent state times that would.

17. A system according to claim 3 wherein the controller is arranged, for some values of the demanded voltage parameter set, to define the modified state times as being for the same two states as the two nominal state times, one being of said predetermined minimum time, and the other being a predetermined maximum time.

18. A drive system for a multi-phase brushless motor comprising:

a drive circuit having a plurality of states and arranged to apply an electric potential to each of the phases, the circuit including switches to vary the electric potential applied to each of the phases, the switches being switchable to switch the drive circuit between the plurality of states such that the circuit is in each of the states for a respective state time, thereby producing a net voltage;

a current sensor connected such that it can sense the instantaneous total current flowing through the phases; and a controller arranged to define a series of pulse width modulation periods and to provide pulse width modulated drive signals to control the switches so as to control the time that the drive circuit switches between said states in each of the pulse width modulation periods, and to:

determine a demanded voltage parameter set, for some values of the demanded voltage parameter set, identify two states which could, if selected for nominal state times, achieve the demanded voltage parameter set, and define modified state times for the same two states, one being of a predetermined minimum time, and the other being a predetermined maximum time.

19. A system according to claim 18 wherein the state having the shorter of the two nominal state times is allocated the predetermined minimum time as its state time.

20. A system according to claim 18 wherein said values of the demanded voltage parameter set are values which cannot be achieved so as to allow a predetermined minimum time to be spent in a predetermined number of active states sufficient for the current in each of the phases to be determined by means of the current sensor.

21. A system according to claim 18 wherein the predetermined maximum time is the time which, when added to the predetermined minimum time, takes up all of the time in the PWM period available for active states.

22. A system according to claim 21 wherein the predetermined maximum time $T_{max}$ is given by $$T_{max} = T_{pwm} - 2T_{id} - T_{ol}$$

Where $T_{pwm}$ is the PWM period
$T_{id}$ is the interlock delay
$T_{ol}$ is the predetermined minimum time.

23. A system according to claim 22 wherein the controller is arranged to determine the state times using space vector modulation.

24. A system according to claim 22 wherein the controller is arranged to determine the state times using a method other than space vector modulation.

25. A system according to claim 22 for a motor wherein the phases are connected in a star formation.

* * * * *

UNITED STATES PATENT AND TRADEMARK OFFICE
CERTIFICATE OF CORRECTION

PATENT NO. : 7,545,110 B2
APPLICATION NO. : 11/784505
DATED : June 9, 2009
INVENTOR(S) : Connel Brett Williams and Jiang Li It is certified that error appears in the above-identified patent and that said Letters Patent is hereby corrected as shown below:

Claim 7, Column 11, Line 54, please delete the formula commencing on Line 59 and insert the following formula:

$$\text{IF } (T_a + T_b/2) > (\sqrt{3})/2 \text{ THEN}$$
$$T_b' = T_b/\sqrt{3}(2T_a + T_b)$$
$$T_a' = (\sqrt{3})/2 - T_b'/2$$

$$\text{IF } (T_b + T_a/2) > (\sqrt{3})/2 \text{ THEN}$$
$$T_a' = T_a/\sqrt{3}(2T_a + T_b)$$
$$T_b' = (\sqrt{3})/2 - T_a'/2$$

Signed and Sealed this

Second Day of February, 2010

David J. Kappos
*Director of the United States Patent and Trademark Office*